Aug. 18, 1931.  J. KRÖPPELIN  1,819,468
SYSTEM OF VOLTAGE REGULATION
Filed Nov. 7, 1927   2 Sheets-Sheet 1
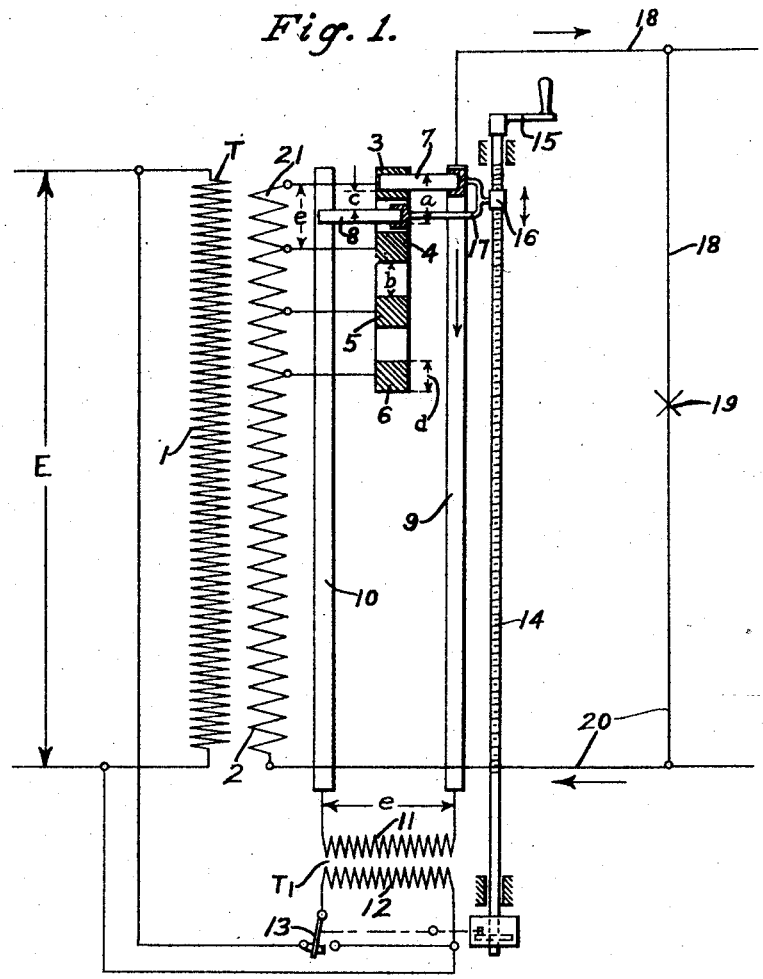
WITNESSES:
R. S. Williams
Lyman D. Oberlin
INVENTOR
Johannes Kröppelin
BY
ATTORNEY

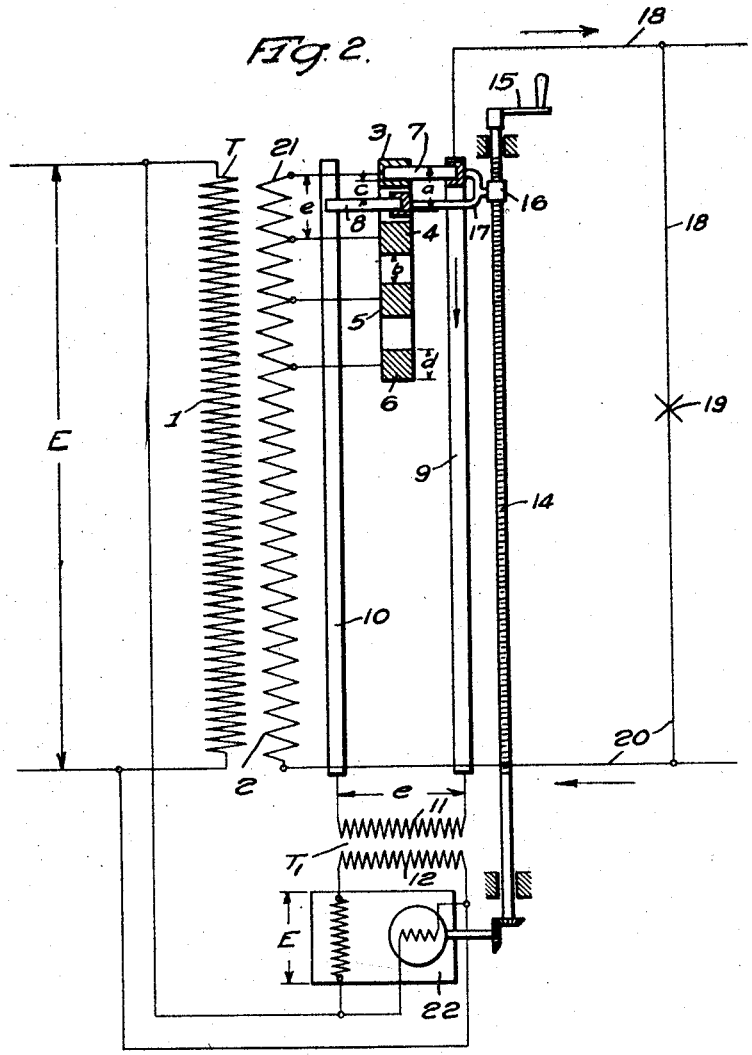

Patented Aug. 18, 1931

1,819,468

UNITED STATES PATENT OFFICE

JOHANNES KRÖPPELIN, OF BERLIN-CHARLOTTENBURG, GERMANY, ASSIGNOR TO WESTINGHOUSE ELECTRIC & MANUFACTURING COMPANY, A CORPORATION OF PENNSYLVANIA

SYSTEM OF VOLTAGE REGULATION

Application filed November 7, 1927, Serial No. 231,527, and in Germany October 18, 1926.

In accordance with my invention, the voltage ratio of a transformer may be varied by changing the connection of one of the power circuit conductors from one to another of a plurality of tap connections to one of the windings of the transformer. When changing from one tap connection to the next connection of the series to disconnect a section of the main transformer winding from the circuit, an auxiliary voltage corresponding to the voltage in the main transformer winding between the tap connections is first connected in parallel to the main transformer winding section that is to be disconnected. The current of the main circuit is, for the time being, conducted through both the section of the main transformer and an auxiliary transformer winding having corresponding voltages generated therein. The connection of the main transformer winding is first interrupted, the auxiliary transformer winding is then short circuited and the new tap connection made, after which the auxiliary transformer winding is again open circuited.

In operating the tap changing mechanism in a direction to add a section of the main transformer winding to the circuit thereof, the steps above-described are performed in the reverse order.

Further in accordance with my invention, the aforesaid source of electromotive force is suitably changed in magnitude, preferably by a device known to the art as an induction regulator.

My invention resides in the system, apparatus and features of construction of the character hereinafter described and claimed.

For an understanding of my invention and for an illustration of some of the forms my apparatus may take, reference is to be had to the accompanying drawings in which, Fig. 1 is a diagrammatic view of a system constructed in accordance with my invention, Fig. 2 is a diagrammatic view of an arrangement for varying the voltage of an auxiliary transformer.

Referring to the drawings, there is illustrated a main transformer T comprising, in the example shown, a primary winding 1 and a secondary winding 2 provided with taps 3, 4, 5 and 6. Contact members 7 and 8 movable, respectively, on conductive guiding members or bars 9 and 10 coact with the aforesaid taps 3, 4, 5 and 6, and are so connected mechanically that they will remain spaced apart the same distance.

Connected to the members 9 and 10 is the secondary winding 11 of an exciter or auxiliary transformer Tl, the primary winding 12 of which is connected across the conductors leading to the winding 1. A switch 13 for short-circuiting the winding 12 is controlled by a shaft or rotatable member 14 mounted in suitable bearings and having a crank or actuating member 15 secured to one end thereof. Coacting with the shaft 14 is a member 16 movable in opposite directions, respectively, longitudinally of shaft 14 upon rotation thereof in opposite directions, the said member 16 comprising a conductive connection 17 disposed between the members 7 and 8 by which the latter are movable with respect to the taps 3, 4, 5 and 6.

Connected to the member 9 is a conductor 18, connected to one terminal of a suitable energy-translating or consuming device 19, the other terminal of which is connected to one end of the winding 2.

The distance $a$ between the outer edges of the movable contact members should be larger than the distance $b$ between the inner edges of two successive contact surfaces of any of the aforesaid taps. The distance $c$ between the inner edges of the contact members 7 and 8 should be less than the breadth $d$ of one of the taps 3, 4, 5 and 6. When these dimensions are observed, there is always an electrical connection between the winding 2 and at least one of the contact members 7 or 8 during movement thereof.

As illustrated on the drawings, the transformer Tl is so energized that the voltage $e$ across its secondary winding 11 is equal to the voltage between two adjacent taps of the winding 2, that is, it is equal to the voltage across the section 21 of winding 2.

With the apparatus positioned as shown, contact member 7 engages tap 3 while contact member 8 is disengaged from all the taps. Accordingly, a circuit is established as follows: one terminal of device 19, conductor 18, contact member 7, tap 3, the entire winding 2, and thence by way of conductor 20 back to the other terminal of device 19. Upon rotation of shaft 14 to move contact member 7 into engagement with tap 4, the section 21 of winding 2 is eliminated from the circuit and the effective voltage across the terminals of the device is diminished by the amount $e$. The change from position 3 to position 4 is as follows:

The switch 13 is first actuated to energize winding 12 from the main circuit. Thereupon, the shaft 14 is rotated to move the contact members 7 and 8 downwardly as viewed in Fig. 1. As soon as contact member 8 engages tap 4, the winding 11 is connected in parallel to the section 21. Continued rotation of shaft 14 disengages contact member 7 from tap 3. As a result, the section 21 of winding 2 is eliminated from the circuit but the total voltage across the terminals of device 19 remains unchanged since winding 11 furnishes an additional voltage equal to that of the section 21.

Elimination of a section 21 of winding 2 from the circuit, as aforesaid is attended with little or no sparking. The load current now flows by way of conductor 18, winding 11, and tap 4. The winding 11 may now be eliminated from the circuit by operating switch 13 to short circuit the winding 12, the tap 4 being engaged by the movable contact member 7 only after the switch 13 has been operated.

In accordance with my invention, the voltage across the secondary winding 11 of transformer $Tl$ may be adjusted in magnitude by the arrangement illustrated in Fig. 2. To this end, the primary winding 12 of said transformer $Tl$ is connected in series with an induction regulator 22 and across the circuit connected to the primary winding 1 of transformer T. The induction regulator 22 should be so designed that it generates a voltage equal to that impressed across the primary winding 1, or a voltage E. Accordingly, the voltage induced in the secondary winding 11 is equal to the vector sum of E and the voltage induced in the induction regulator. In the limiting positions of the induction regulator, the voltages induced in winding 12 are equal either to zero or 2E, while in the winding 11, there is induced either the voltage $e$ or zero.

It follows, therefore, with the arrangement illustrated in Fig. 2, that arcing is eliminated since the switch 13 of Fig. 1 is not utilized. Moreover, the voltage of winding 11 may be regulated in small steps from zero to the value $e$. Thus, in addition to the coarse voltage regulation derived from the taps 3, 4, 5 and 6 of transformer T, there may be obtained a regulation in suitable small steps by the induction regulator 22.

I claim as my invention:

1. The combination with a main transformer winding comprising a plurality of sections, of contact members for successive connection to the respective terminals of said sections, an auxiliary transformer having a winding connected to said contact members, and means comprising an induction regulator for varying the voltage produced by said auxiliary transformer.

2. The combination with a main transformer winding comprising a plurality of sections, of contact members for successive connection to the respective terminals of said sections, an auxiliary transformer having a winding connected to said contact members, and means comprising an induction regulator for varying the voltage produced by said auxiliary transformer, said regulator including a winding for generating a voltage substantially equal to the voltage supplied to said main transformer.

In testimony whereof, I have hereunto subscribed my name this 20th day of September, 1927.

JOHANNES KRÖPPELIN.